C. L. DOWNER.
INTERNAL COMBUSTION ENGINE.
APPLICATION FILED DEC. 7, 1917.
1,313,170.
Patented Aug. 12, 1919.
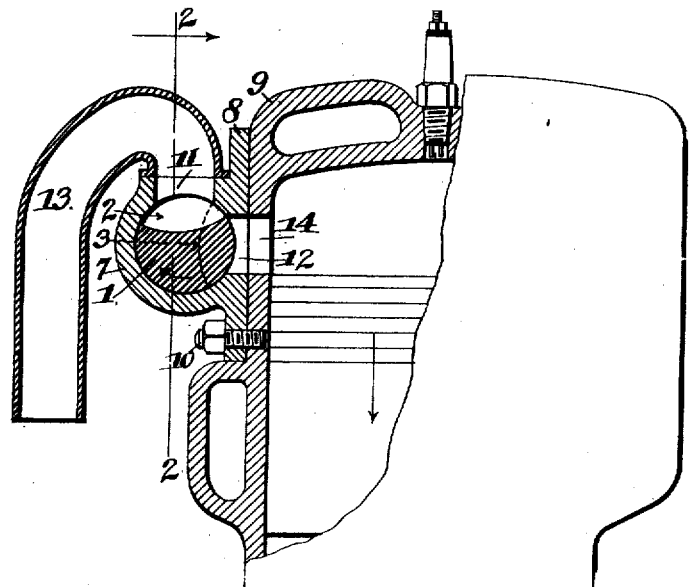
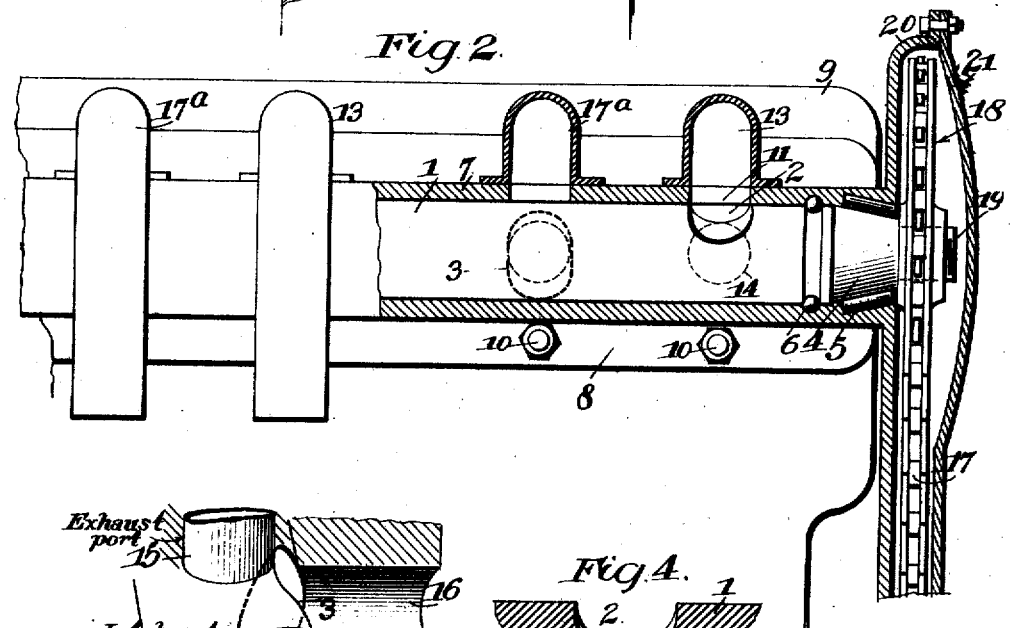
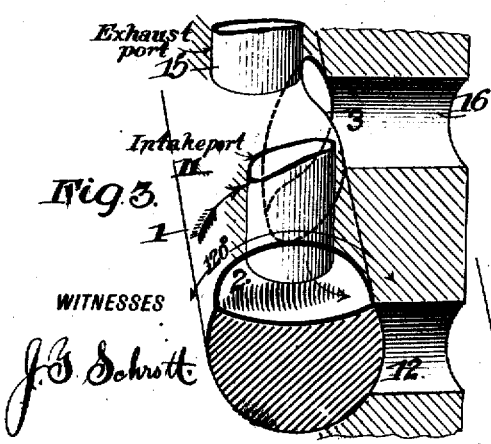
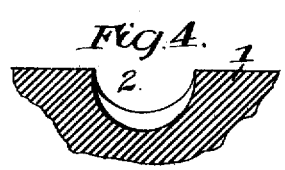
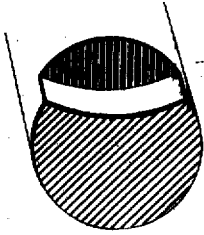
WITNESSES
J. G. Schrott
INVENTOR
C. L. Downer
BY
ATTORNEYS

UNITED STATES PATENT OFFICE.

CLARENCE LEONARD DOWNER, OF IDAHO FALLS, IDAHO.

INTERNAL-COMBUSTION ENGINE.

1,313,170. Specification of Letters Patent. Patented Aug. 12, 1919.

Application filed December 7, 1917. Serial No. 206,007.

*To all whom it may concern:*

Be it known that I, CLARENCE L. DOWNER, a citizen of the United States, and a resident of Idaho Falls, in the county of Bonneville and State of Idaho, have invented a new and useful Improvement in Internal-Combustion Engines, of which the following is a specification.

My invention relates to improvements in internal combustion engines, being more particularly an improvement in the valve mechanism therefor, and it consists in the construction, combinations and arrangements herein described and claimed.

An object of my invention is to provide an internal combustion engine in which is embodied a rotary valve body having ports cut on its peripheral surface in such a manner that the functions of the intake and exhaust are performed by the valve body, said valve body being of such a simplified construction that the engine structure is also materially simplified.

Another object of the invention is to provide a rotary valve shaft constructed primarily with a view toward simplicity, thus avoiding the necessity of making special patterns and castings, and permitting the utilization of common machine tools in the formation of the ports.

Another object of the invention is to provide a valve shaft of a uniform diameter insuring a continuous bearing surface and eliminating gas pockets between the ported belts of the valve.

Another object of the invention is to provide a solid valve body insuring stability of motion.

Other objects and advantages will appear in the following specification, reference being had to the accompanying drawing in which:

Figure 1 is a sectional view of a portion of an internal combustion engine, showing the improved valve shaft applied.

Fig. 2 is a cross section taken on the line 2—2 of Fig. 1.

Fig. 3 is a diagrammatic sectional perspective view showing the arrangement of the shaft valves.

Fig. 4 is a cross section of a portion of the valve shaft showing a semi-circular valve, and Fig. 5 is a detail perspective view showing a square valve.

In carrying out my invention, I provide a round and solid valve shaft 1 which has one or more intake valve ports 2 cut into the peripheral surface thereof, and one or more exhaust valve ports 3 similarly cut into the peripheral surface thereof at a prescribed distance from the intake valve port. The end of the valve shaft 1 is tapered at 4 as shown in Fig. 2, to provide a conical bearing surface for the rollers 5 of a thrust bearing. The other end of the valve shaft is formed similarly to the end pictured in Fig. 2. Ball bearings 6 are provided on each end adjacent to the conical bearing surface 4. Similar ball bearings may be distributed at other places in the length of the valve shaft.

The valve shaft 1 rotates in a casing 7 having flanges 8 by which the casing is bolted to the cylinders 9 of the engine, through the stud bolt 10. The casing 7 has intake ports 11 and 12 arranged at right angles to each other, as illustrated in Fig. 1, and communicating with the bore of the casing. The port 11 also communicates with the intake manifold 13. The port 12 communicates with the cylinder port 14. The intake valve port 2 in the valve shaft 1, rotates in the plane of the ports 11 and 12, and registers therewith to admit a charge of gas to the engine on the induction stroke of the piston.

The exhaust valve port 3 moves in the plane of the exhaust ports 15 and 16 arranged at right angles to each other in the casing 7, as shown in Fig. 3. The exhaust port 15 communicates with the exhaust manifold 17. The port 16 communicates with an exhaust cylinder port similar to the one 14 in Fig. 1. The exhaust valve port 3 is adapted to register with the exhaust ports 15 and 16 which communicate with the bore of the casing 7, at such a time when the engine piston moves upon the exhaust stroke, to permit the scavenging of the cylinder of the products of combustion.

The valve shaft 1 is rotated in the casing 7, by a chain 17 applied to a sprocket 18 mounted upon the reduced and threaded end 19 of the shaft. The train 17 is driven from the crank shaft of the engine and since the arrangement is obvious, the illustration has been omitted. The valve shaft 1 may be driven equally as well by a train of intermeshing gears, or by a belt and pulleys, if it be so desired. The particular manner of driving the shaft is immaterial, however The sprocket 18 is incased in a housing 20 which may be either a separate member from the shaft casing 7, or made integrally therewith as illustrated in Fig. 2. An extension of the housing 20 also receives the sprocket chain 17, and a cover plate 21 fits over all, making a tight chamber for the driving elements of the shaft 1, which may be filled with oil if it be so desired.

It will be observed in Fig. 2, that there are separate intake and exhaust manifolds 13 and 17 for each cylinder of the engine. While the drawing does not show it, these members are really branches of main intake and exhaust manifolds, so that the fresh gas enters by one common manifold, and the burnt gases are discharged through one common manifold. It will also be observed that the one valve shaft 1 combines all the functions of handling the gases, which functions usually require a far more elaborate arrangement than the present invention requires.

The valve ports occupy approximately 120° of the surface of the valve shaft. The intake and exhaust valve ports 2 and 3 are 90° apart in circumferential relationship. In forming the valve port in the surface of the shaft 1, no elaborate machinery is required, as will be obvious, any one of a number of simple cutting tools being capable of employment to cut the valve port to utmost satisfaction.

The shape of the valve port is to be noted. It will be seen in Fig. 4 that the valve port 2, to which all other valve ports are similar, is substantially semi-circular in cross section with respect to the axis of the shaft 1. The inherent quality of the cutting tool employed and the manner in which the valve is cut on the peripheral surface of the shaft, makes the central portion of the valve at once the deepest and roundest portion of the valve. As the lateral extremities of the valve port are reached, that is to say, where the trough of the valve port approaches the periphery of the shaft, the valve port is of course more shallow and more nearly elliptical in cross section. It will also be observed that the bottom of the valve port does not extend straight across from end to end. On the contrary, the trough of the valve port is concave. This particular formation is also incidental to the nature of the cutting tool employed and the concavity of the trough of the valve port depends altogether on the diameter of the cutting tool employed. In other words, should the cutting tool be of a great diameter, the concavity of the trough will be less than it will be when a cutting tool of small diameter is employed. While, as above stated, these features are incidental to the nature of the cutting tools employed, yet they have their advantages. For instance, when the valve shaft 1 is in such a position that the valve port 2 is in registration with both intake ports 11 and 12, the concave formation of the bottom of the valve port provides a substantially circular continuation of the ports 11 and 12. The entering gases in striking the concave bottom of the valve port 2, glide into the cylinder with greater speed than would be the case if the bottom of the valve port were simply made straight, and with the added advantage that the volume of the gas is concentrated in a measure and enters the cylinder with more force than otherwise.

The particular formation of the valve ports as just described, is not to be rigidly adhered to. A valve port of the shape shown in Fig. 5 may also be employed. This valve port is made by a different cutting tool, and one that reciprocates and gouges out portions of the valve shaft instead of cutting the portions away by a rotating cutter as is the case where the valve port is formed as illustrated in Fig. 4.

The valve shaft 1 is of a constant and uniform diameter throughout. There are no intermediate shaft portions and then larger valve portions, but the shaft is the same diameter from one end to the other, with the exceptions of course, of the conical bearing ends 4. The uniform diameter of the valve shaft insures a continuous bearing surface with the added and great advantage of the avoidance of gas pockets between the ported or valved belts of the shaft. In this construction, there are no chambers between the respective valve ports 2 and 3 on the peripheral surface of the shaft 1, where gases can collect, to the detriment of the operation of the engine. Again, the solid valve body insures stability of motion. The valve shaft 1 is, of course, of a greater weight than it would be were it made hollow, as is sometimes the case. This solid shaft when put into motion, virtually acts as a flywheel for itself, and because of its weight stores some of the energy imparted thereto by the rotating sprocket 18, and thus tends to keep the shaft 1 at a uniform rate of rotation.

There is another advantage which becomes obvious from the foregoing description. The valve shaft 1 must, of course be true and fit the bore of the casing 7 so that it rotates smoothly therein. A true valve shaft is produced however, with little effort and at a correspondingly low cost. The positions of the ports are determined and the ports are cut into the peripheral surface of the shaft by the cutting tools mentioned. The major portion of the work is then done, and thus by the use of both a minimum amount of material and labor. Obviously, the valve shaft 1 can be produced very cheaply. The valve shaft thus constitutes two important elements usually employed and necessary in an engine, and combines them in a novel manner, namely, the valve shaft *per se*, and the valve ports. The valve is intended primarily for use on a 2-cycle engine, although it may be employed equally as well on a 4-cycle engine. The operation is as follows: The valve shaft 1 rotates in the clockwise direction toward the cylinder 9, as indicated in Fig. 1. Here, the valve port 2 is shown just at the edge of the cylinder port 12 and about to move into registration therewith. When the piston of the cylinder continues its induction stroke, a charge of gas is drawn in. At the same time, the exhaust valve port 3 indicated in dotted lines, moves farther away from the exhaust port so that all communication between the exhaust port and the interior of the cylinder 9, is severed. The rotation of the valve shaft 1 is so timed and the peripheral length of the valve 2 is such, that communication between the intake manifold 13 and the ports 12 and 14 is cut off at the same time that the piston is ready to move on the compression stroke.

After the gas is compressed and exploded, and the piston has reached the limit of its working stroke, the exhaust valve port 3 will have reached a position corresponding to that now assumed by the intake valve port 2, so that upon continued rotation of the valve shaft 1, the valve port 3 moves farther into registration with the exhaust port 16, so that the burnt gases may be expelled when the piston moves on its exhaust stroke.

While the construction and arrangement of the device as illustrated in the accompanying drawing is that of a generally preferred form, obviously modifications and changes may be made without departing from the spirit of the invention or the scope of the claims.

I claim:

1. The combination of an engine cylinder having a flat side with intake and exhaust cylinder ports, a valve casing including flanges secured upon said flat side, and having right angularly disposed ports communicating with the bore of the casing and the cylinder ports respectively, a solid valve body occupying the bore of the casing and having valve kerfs cut into the peripheral surface thereof, and means for rotating the valve body.

2. The combination of the engine cylinder having a flat side with cylinder ports, a casing secured upon the flat side and having a bore with ports communicating with the cylinder ports, a housing section carried by the casing at one end, a valve shaft completely occupying the bore and constituting the valve body, the ends of said body being conical and one end being reduced and threaded, said valve body having valve kerfs cut into the peripheral surface to coact with the ports, thrust bearings engaging the conical ends, adjacent ball bearings, a driving sprocket and chain mounted on the threaded end occupying the housing respectively, and a cover plate for the housing.

CLARENCE LEONARD DOWNER.